US008959572B2

(12) United States Patent
Yin et al.

(10) Patent No.: US 8,959,572 B2
(45) Date of Patent: Feb. 17, 2015

(54) POLICY ENFORCEMENT OF CLIENT DEVICES

(75) Inventors: Li Yin, Redmond, WA (US); Param Reddappagari, Redmond, WA (US); Mayur Kamat, Bothell, WA (US); Zhengping Zuo, Sammamish, WA (US); Hong Zhang, Redmond, WA (US)

(73) Assignee: Google Inc., Mountain View, CA (US)

( * ) Notice: Subject to any disclaimer, the term of this patent is extended or adjusted under 35 U.S.C. 154(b) by 475 days.

(21) Appl. No.: 13/284,475

(22) Filed: Oct. 28, 2011

(65) Prior Publication Data
US 2013/0111541 A1    May 2, 2013

(51) Int. Cl.
| G06F 17/00 | (2006.01) |
| G06F 21/62 | (2013.01) |
| G06F 21/57 | (2013.01) |
| H04L 29/06 | (2006.01) |
| H04W 4/00 | (2009.01) |

(52) U.S. Cl.
CPC ...... *H04L 63/102* (2013.01); *G06F 2221/2141* (2013.01); *G06F 21/6218* (2013.01); *G06F 21/577* (2013.01); *H04W 4/001* (2013.01)
USPC ...................... 726/1; 726/2; 726/10

(58) Field of Classification Search
CPC .... G06F 21/577; G06F 21/6218; H04L 63/10
USPC ...................... 726/1, 2, 10; 709/229
See application file for complete search history.

(56) References Cited

U.S. PATENT DOCUMENTS

| 2004/0167984 | A1* | 8/2004 | Herrmann ..................... 709/229 |
| 2008/0040785 | A1 | 2/2008 | Shimada |
| 2009/0247125 | A1 | 10/2009 | Grant |
| 2010/0081417 | A1 | 4/2010 | Hickie |
| 2010/0125891 | A1 | 5/2010 | Baskaran |
| 2010/0306827 | A1 | 12/2010 | Esteve Balducci et al. |
| 2011/0030029 | A1 | 2/2011 | Woo |
| 2011/0162076 | A1* | 6/2011 | Song et al. ..................... 726/26 |
| 2011/0173676 | A1 | 7/2011 | Peckover |
| 2011/0225624 | A1 | 9/2011 | Sawhney et al. |
| 2011/0258479 | A1 | 10/2011 | Hanna |

FOREIGN PATENT DOCUMENTS

| EP | 1 780 643 A1 | 5/2007 |
| EP | 2 196 933 A2 | 6/2010 |
| EP | 2 284 685 A2 | 2/2011 |

OTHER PUBLICATIONS

"Network Access Control," Retrieved form the Internet: http://3n.wikipedia.org/w/index.php?title=Network_Access_Control&oldid=445727945, Aug. 19, 2011, 4 pp.
International Search Report and Written Opinion of international application No. PCT/US2012/060839, dated Jan. 4, 2013, 13 pp.
International Search Report on Patentability from International Application No. PCT/US2012/060839, mailed May 8, 2014, 8 pages.

* cited by examiner

*Primary Examiner* — Baotran N To
(74) *Attorney, Agent, or Firm* — Shumaker & Sieffert, P.A.

(57) ABSTRACT

A method may include sending, by a client device, an access request to an authentication server device. The access request may include a request to access an administered resource. The method may include in response to the client device not complying with an administrative policy associated with the administered resource, receiving, from the authentication server device, one or more instructions regarding installation of a client application, receiving, by the client device, a client application in accordance with the instructions, and installing the client application on the client device.

18 Claims, 6 Drawing Sheets

POLICY ENFORCEMENT OF CLIENT DEVICES

BACKGROUND

Hand-held mobile devices have become efficient tools for accessing information on computer networks. Employees are increasingly using their mobile devices to remotely access corporate information, applications and other resources. However, if an employee's mobile device does not adhere to a data security policy or access policy at least as stringent as an employer's policies, sensitive corporate information may be susceptible to unauthorized access. For example, if an employee loses his mobile device and the mobile device is not password protected, anyone who finds the mobile device may be able to access corporate information using the mobile device.

SUMMARY

In an embodiment, a method may include sending, by a client device, an access request to an authentication server device. The access request may include a request to access an administered resource. The method may include in response to the client device not complying with an administrative policy associated with the administered resource, receiving, from the authentication server device, one or more instructions regarding installation of a client application, receiving, by the client device, a client application in accordance with the instructions, and installing the client application on the client device.

In an embodiment, a method may include receiving, from a client device, an access request for an administered resource, determining whether the client device is compliant with an administrative policy associated with the administered resource, in response to the client device being compliant with the administrative policy, sending a token to the client device, and in response to the client device not being compliant with the administrative policy, sending the client device one or more instructions instructing the client device how to comply with the administrative policy.

In an embodiment, a method may include receiving, from a client device, a request to access a client application. The client application may be configured to apply an administrative policy to the client device. The method may include sending the client application to the client device and updating a client registry with information indicating that the client device is compliant with the administrative policy.

In an embodiment, a system may include an authentication server device in communication with the client device. The authentication server device may be configured to determine whether a client device is permitted to access one or more administered resources. The system may include a management server device in communication with the client device and the authentication server device. The management server device may be configured to determine whether the client device is compliant with an administrative policy that governs an ability of the client device to access the one or more administered resources.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this application, the following terms shall have the respective meanings set forth below:

A "computing device" refers to an electronic device that performs one or more operations according to one or more programming instructions.

A "client device" refers to a computing device that is configured to access one or more administered resources over a network. A client device may be a portable or mobile electronic device. A client device may include, without limitation, a computer, an Internet kiosk, a personal digital assistant, a cellular telephone, a gaming device, a desktop computer, a laptop computer, a tablet computer and/or the like.

An "authentication server device" refers to a computing device that is configured to determine whether a client device complies with an administrative policy. An authentication server device may include, without limitation, a server, a mainframe computer, a networked computer, a processor-based device, a virtual machine and/or the like.

A "management server device" refers to a computing device that is configured to apply an administrative policy to a client device. A management server device may include, without limitation, a server, a mainframe computer, a networked computer, a processor-based device, a virtual machine and/or the like.

An "administrative policy" refers to one or more rules, policies, guidelines and/or the like governing access by a client device to one or more administered resources.

An "administered resource" refers to one or more application programs that are managed by an administrator.

A "client application" refers to an application program configured to instruct a client device to perform one or more tasks.

Figure 1:
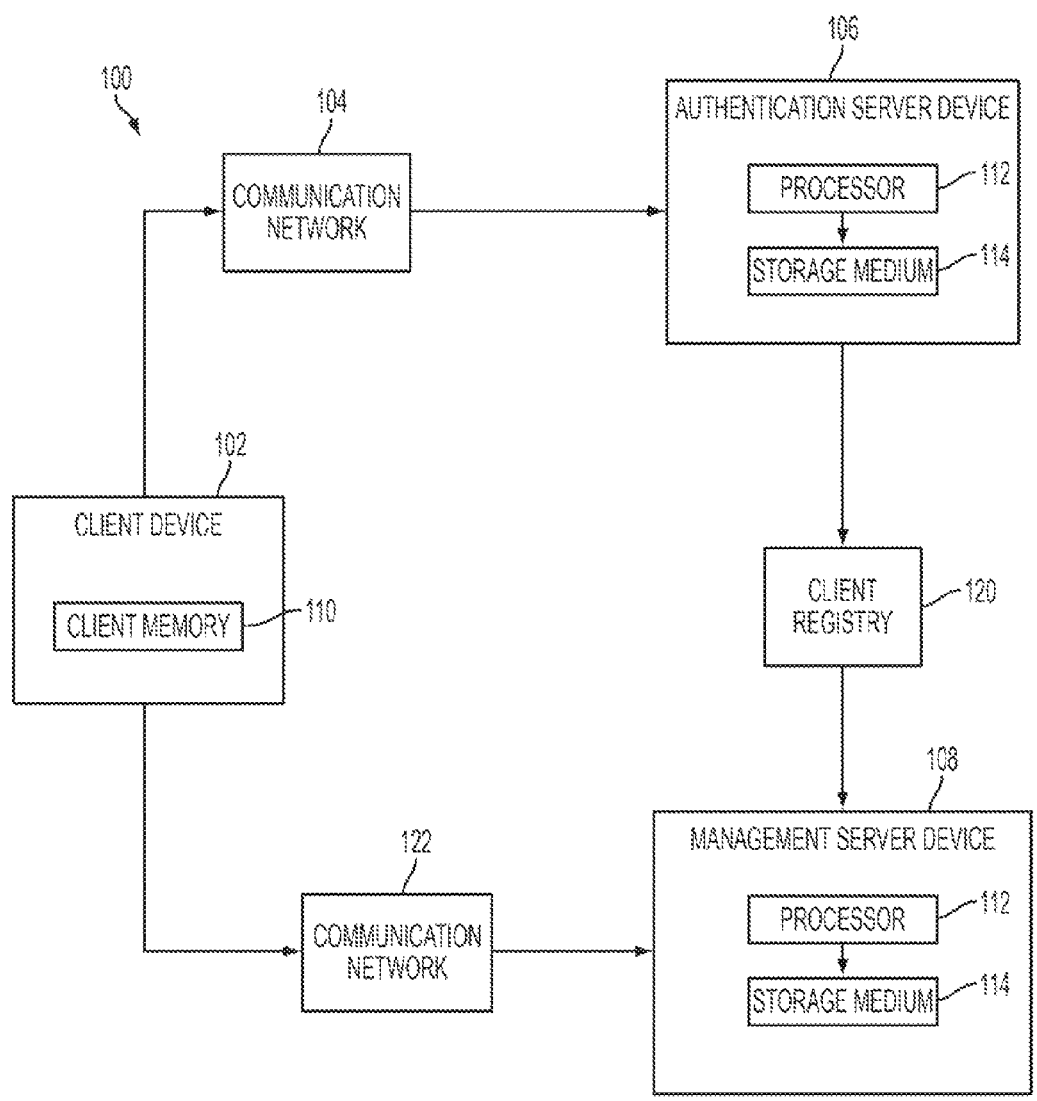
FIG. 1 illustrates a system for authenticating a client device and/or applying an administrative policy to a client device according to an embodiment.

FIG. 1 illustrates a system 100 for authenticating a client device and/or applying an administrative policy to a client device according to an embodiment. In an embodiment, one or more client devices 102 may be connected to one or more communication networks 104, 122. In an embodiment, a client device 102 may include a client memory 110. A communication network 104 may be connected to an authentication server device 106. In an embodiment, the communication network 122 may be connected to management server device 108.

In an embodiment, a communication network 104, 122 may be a local area network (LAN), a wide area network (WAN) and/or the like. For example, a communication network 104, 122 may be an extranet, an intranet, the Internet and/or the like. In an embodiment, a communication network 104, 122 may provide communication capability between the client device 102, the authentication server device 106 and/or the management server device 108.

In an embodiment, a communication network 104, 122 may use HyperText Transport Protocol (HTTP) to transport information using Transmission Control Protocol/Internet Protocol (TCP/IP). HTTP may allow client devices 102 to access resources that are available by way of a communication network 104, 122.

In an embodiment, the authentication server device 106 may include a processor 112 in communication with a computer-readable storage medium 114. The authentication server device 106 may be in communication with one or more client devices 102 and/or the management server device 108. The authentication server device 106, although depicted as a single computer system, may be implemented as a network of computer processors.

In an embodiment, the management server device 108 may include a processor 112 in communication with a computer-readable storage medium 114. The management server device 108 may be in communication with one or more client devices 102 and/or the authentication server device 106. The management server device 108, although depicted as a single computer system, may be implemented as a network of computer processors. Examples of a management server devices 108 may include servers, mainframe computers, networked computers, a processor-based device and/or the like.

In an embodiment, the authentication server device 106 and/or the management server device 108 may be in communication with a client registry 120. A client registry may include information associated with whether a client is in compliance with an administrative policy. In an embodiment, a client registry may be a database or other computer-readable storage medium. A client registry 120 may be stored on the authentication server device 106, the management server device 108 and/or another computing device.

Figure 2:
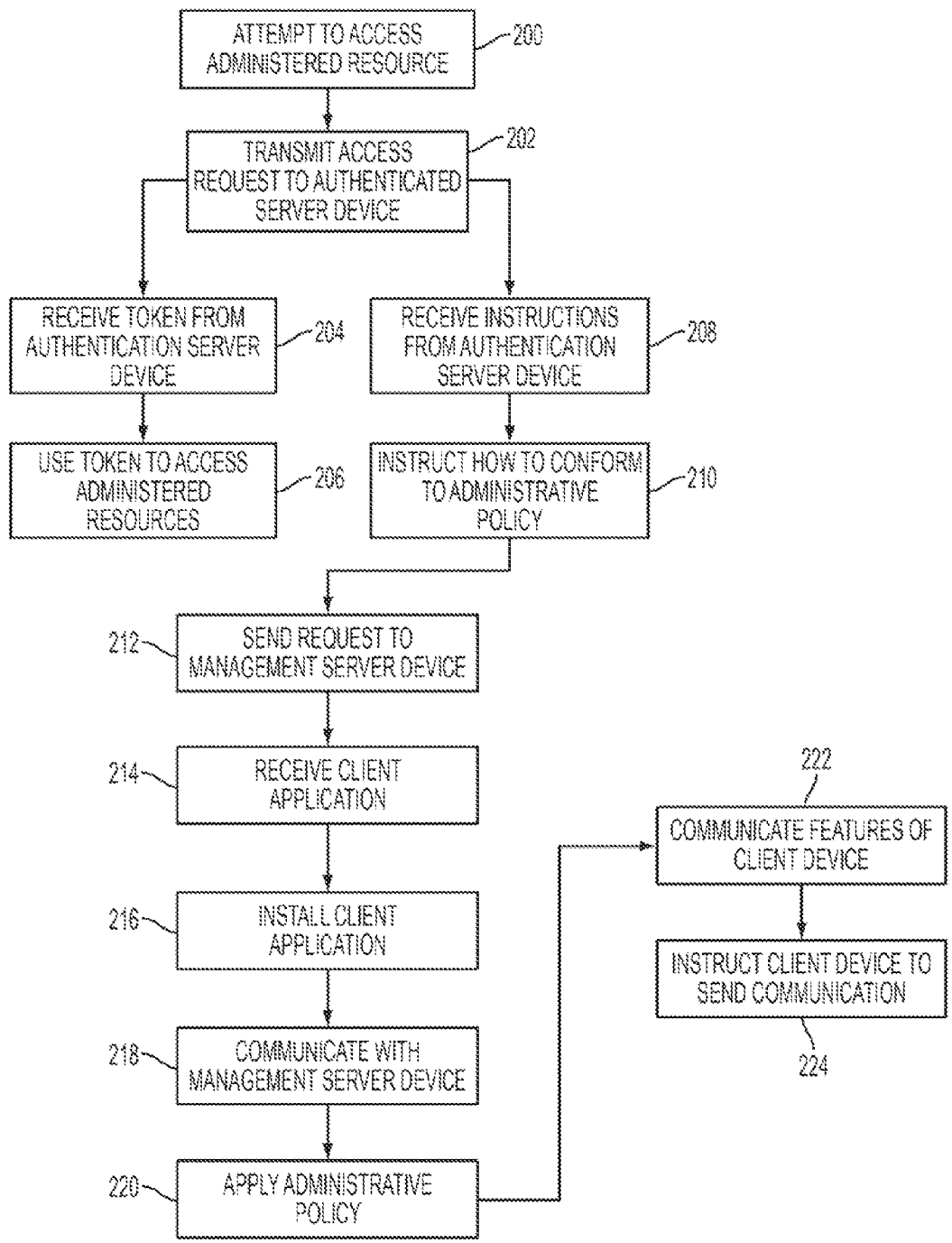
FIGS. 2-4 illustrate methods of authenticating a client device and/or applying an administrative policy to a client device according to some embodiments.

FIG. 2 illustrates a method of authenticating a client device and applying an administrative policy to a client device according to an embodiment. In an embodiment, a client device may attempt 200 to access one or more administered resources. An administered resource may be a software application that is managed by an administrator that is not the client device user. For example, email applications, word processing applications and calendar applications may be examples of administered resources, and these resources may be managed by an employer administrator. Additional and/or alternate administrators may be used within the scope of this disclosure.

In an embodiment, a client device may attempt 200 to access an administered resource in response to a user selecting an icon, a graphic, a link or other representation of an administered resource on the client device. In an embodiment, a client device may attempt to access an administered resource in response to a client device user providing login information, such as a username and/or password, associated with an administered resource.

In an embodiment, a client device may transmit 202 an access request to an administered resource to the authentication server device. The access request may include an identifier associated with the client device that is requesting access. In an embodiment, the access request may include an administered resource or resources to which the client device is requesting access. The access request may include an encrypted password or other encrypted information.

Figure 3:
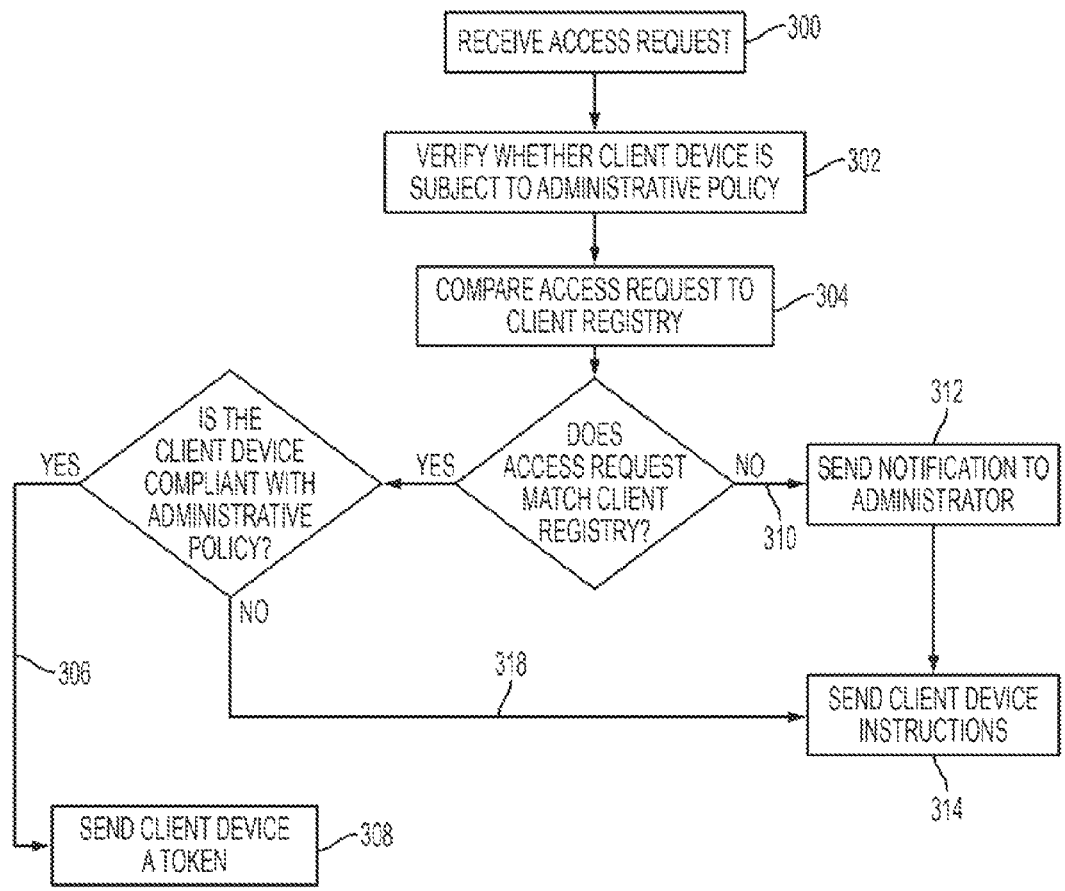
Figure 4:
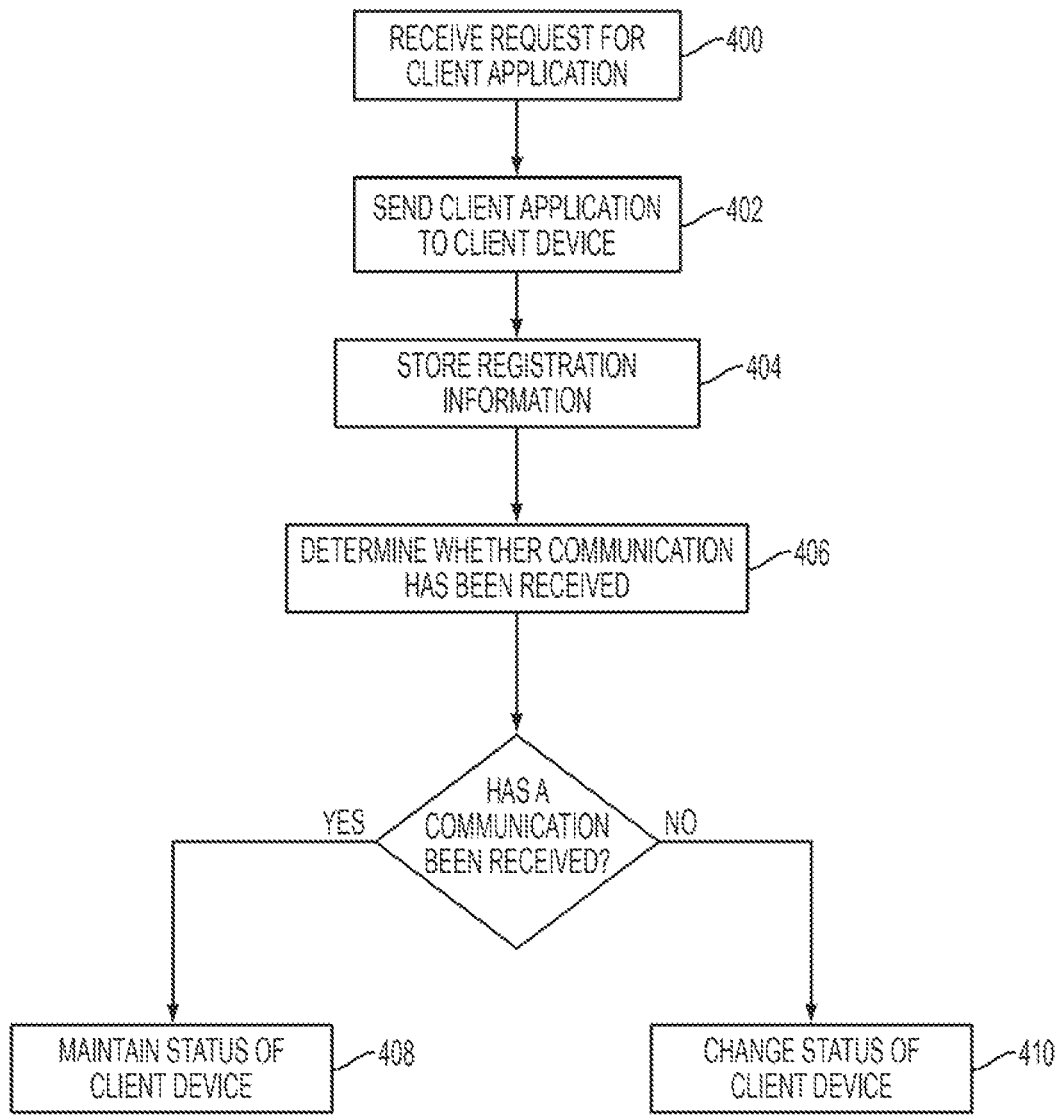

FIG. 3 illustrates a method of authenticating a client device by an authentication server device according to an embodiment. As illustrated by FIG. 3, the authentication server device may receive 300 the access request and may verify 302 whether the client device is subject to an administrative policy. In an embodiment, an administrative policy may include one or more rules, conditions and/or the like that a client device must meet in order to access one or more administered resources. In an embodiment, an administrative policy may include one or more data security policies. Example data security policies may include remotely wiping data from lost or stolen client devices, locking idle client devices after a period of inactivity, requiring a password to access a client device, setting a minimum length for one or more client passwords, requiring passwords to have a certain format, and/or the like. In an embodiment, an administrative policy may be administered for a set of administered resources. For example, the same set of data security policies may apply to all administered resources associated with an employer. Alternatively, each administered resource may be associated with a different administrative policy. For example, a first administered resource may be associated with a first administrative policy while a second administered resource may be associated with a second administrative policy.

In an embodiment, the authentication server may verify 302 whether the client device is subject to an administrative policy by analyzing the client registry. The client registry may include a list of clients and a status associated with each. For example, the client registry may include a unique identifier associated with each client in the registry, and a status for each client as to whether the client device is compliant with an administrative policy. Exemplary unique identifiers may include a serial number or other unique alpha-numeric identifier associated with a client device. Table 1 illustrates an exemplary client registry according to an embodiment.

TABLE 1

| Client Device | Identifier | Compliant with Administrative Policy |
|---|---|---|
| Client Device 1 | 245XCY23 | Yes |
| Client Device 2 | 871FGB10 | No |
| Client Device 3 | 3JB9082NB | Yes |

In an embodiment, upon receiving an access request, the authentication server may compare 304 at least a portion of information received in the access request to information in the client registry. For example, the authentication server may compare 304 the client identifier in the access request to the client registry to determine whether the client device requesting access is already subject to the administrative policy, is compliant with the administrative policy and/or the like.

In an embodiment, if the portion of information received in the access request matches information from the list of authenticated client devices and the client registry indicates that the client device is compliant with the administrative policy 306, the authentication server may send 308 the client device a token. For example, referring to Table 1, the authentication server device may send 308 Client Device 1 a token in response to receiving an access request from Client Device 1 because Client Device 1 is listed in the client registry and is identified by the client registry as being compliant with the administrative policy.

In an embodiment, a client device may receive 204 the token from the authentication server device. In an embodiment, the client device may 206 use the token to access one or more administered resources. In an embodiment, only those devices having a token may be allowed to access the one or more administered resources.

In an embodiment, if the portion of information received in the access request does not match information from the client registry 310, a notification may be sent 312 to an administrator. The notification may request that the administrator approve or deny the request. For example, an email that includes information regarding the access request may be sent to an administrator. The administrator may be asked to approve or deny the request. If the request is denied, the client user may be informed that access has been denied. If the request is approved, the authentication server device may send 314 the client device one or more instructions as described below.

In an embodiment, if the portion of information received in the access request does not match information from the client registry 310, or if the portion of information matches information from the client registry but the client registry indicates that the client is not compliant with the administrative policy 318, the authentication server may send 314 the client device one or more instructions. For example, referring to Table 1, the authentication server device may send 314 Client Device 4 one or more instructions in response to receiving an access request from Client Device 4 because a unique identifier associated with Client Device 4 is not included in the client registry. As another example, the authentication server device may send 314 Client Device 2 one or more instructions in response to receiving an access request from Client Device 2 because the client registry indicates that Client Device 2 is not compliant with the administrative policy.

In an embodiment, the one or more instructions may be received 208 by the client device. The instructions may instruct 210 the client device and/or a user of the client device how the client device can conform to the administrative policy. For example, the one or more instructions may instruct 210 the client device to download a client application from a certain location to the client device in order to apply the administrative policy to the client device. In an embodiment, the one or more instructions may cause text to be displayed on a display of the client device. The text may inform a user of the client device how to apply the administrative policy to the client device. For example, the text may inform a user that a client application must be downloaded from a certain location in order to apply the administrative policy to the client.

In an embodiment, a client application may send 212 a request to a management server device to obtain the client application. The request may be received 400 by the management server device. The management server device may store the client application in memory associated with the management server device. In an embodiment, a client device may send 212 a request to a management server device in response to a user selecting an icon, a graphic, a link or other representation associated with the client application. For example, a user may select an icon associated with the client application from a webpage, such as an application marketplace and/or the like. In an embodiment, a user may be required to purchase the client application. In an alternate embodiment, a user may receive the client application free of charge.

In an embodiment, the management server device may send 402 the client application to the client device which may receive 214 the client application. The client application may be installed 216 on the client device and may communicate 218 with the management server device. For example, the client device may register with the management server device. In an embodiment, a user of a client device may provide registration information to the management server device. Registration information may include a unique identifier associated with the client device, a telephone number associated with the client device, a user's name, a user's address and/or the like. In an embodiment, registration information may be automatically provided by the client device without user interaction.

In an embodiment, the management server device may store 404 registration information associated with one or more client devices that have received the client application. In an embodiment, the management server device may store 404 at least a portion of the registration information in the client registry. For example, if a client not already included in the client registry downloads a client application, the management server device may add information regarding the client device, such as, for example, a unique identifier, to the client registry. The management server device may also add an indication to the client registry that the client device is compliant with the administrative policy.

In an embodiment, the client application may apply 220 one or more of the policies of the administrative policy associated with the client application to the client. For example, if access to the client device does not require a password, the client application may prompt a user to enter a password for the client device. Similarly, if a password for a client device does not meet a minimum length or format as required by an administrative policy, the client application may require a client device user to provide a password that meets such requirements. In an embodiment, the client application may force a password reset. The password may be reset by the client device user, or it may be provided by the administrator.

In an embodiment, the client application may automatically lock the client device in response to the client operating in a sleep mode or other idle mode for a period of time. In an embodiment, the client application may prevent the client device from operating in a sleep or other idle mode.

In an embodiment, a client application may delete, erase or otherwise remove information from a client device. For example, a client application may perform a factory reset on a client device. A client application may remove information from a client device in response to receiving one or more instructions from the management server device. In an embodiment, the management server device may send the client application instructions to remove data if the client device is reported as lost or stolen. In an embodiment, the management server device may send the client application instructions to remove data if a client device's user becomes unaffiliated with the administrator. For example, an employer may want to remove information from an employee's client device if the employee quits, is fired or otherwise stops work for the employer. As such, a former employee may continue to use his or her personal client device even after his or her employment is terminated. In an embodiment, information may be removed from a client device without providing any notice or receiving any confirmation from a client device user.

Figure 5:
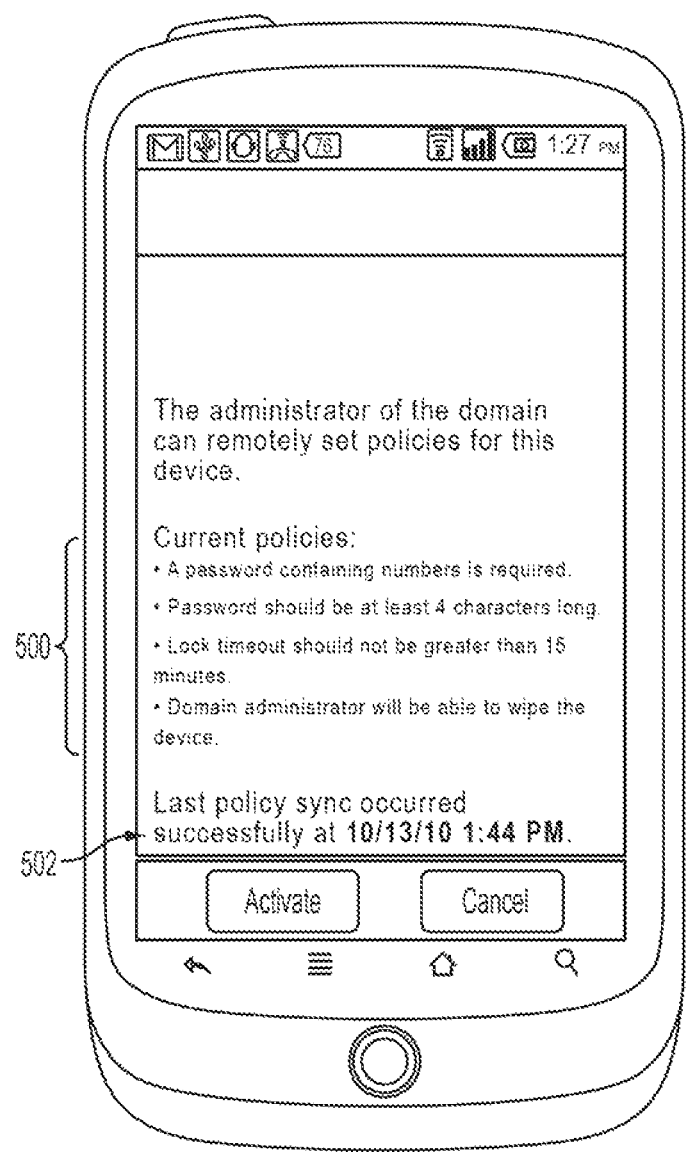
FIG. 5 illustrates information that may be displayed on a client device regarding a client application according to an embodiment.

FIG. 5 illustrates exemplary information that may be displayed on a client device regarding a client application according to an embodiment. As illustrated by FIG. 5, the information may include one or more current administrative policies that apply to the client device 500 and/or a date and/or time 502 of the most recent administrative policy update.

In an embodiment, the client application may communicate 222 one or more features of the client device to the management server device. For example, the client application may communicate 222 to the management server device a phone number associated with the client device, a serial number associated with the client, whether a call to or from the client device is active, a phone number associated with a telephone that called the client device, a phone number associated with a telephone that the client device called, a location, such as a GPS location, of the client device and/or the like. In an embodiment, the client application may allow a remote device, such as for example, the management server device to write to client memory, such as USB storage, an SD card, and/or the like. In an embodiment, the management server device may monitor failed login attempts to client. The client application may require that a password associated with the client device be reset in response to a certain number of sequential failed login attempts.

In an embodiment, updates to an administrative policy may be provided 406 to a client device. For example, if an administrative policy is changed, the management server device may send 406 the updated administrative policy to a client device. In an alternate embodiment, a client device may periodically or regularly query the management server device, or another device, for updates to an administrative policy.

In an embodiment, the client application may instruct 224 the client device to send a communication to the management server device at certain response times. For example, the client application may instruct 224 the client device to send a communication to the management server device after every three hours. In an alternate embodiment, the client application may instruct 224 the client device to send a communication to the management server device at one or more times. For example, the client application may instruct 224 the client device to send a communication to the management server device at 12:00 A.M., 6:00 A.M, 12:00 P.M. and 6:00 P.M. every day. Additional and/or alternate times and/or time periods may be used within the scope of this disclosure.

In an embodiment, a management server device may determine 406 whether a communication has been received by a client device. For example, a management server device may determine 406 whether a communication has been received by a client device at a certain time, within a certain time period and/or the like. If the client device fails to send one or more communications to the management server, the client application may have been uninstalled or otherwise removed from the client device or may be faulty. In either case, a risk exists that the client device is no longer compliant with the administrative policy.

In an embodiment, the management server device may maintain 408 the status of a client device in the client registry as compliant with the administrative policy so long as the management server device receives a communication from the client device by the response time or within a certain time period after the response time. For example, if the client device is scheduled to send a communication to the management server device at 12:00 P.M., the management server device may maintain 408 the status of the client device in the client registry as compliant if the management server device receives a communication from the client device between 11:58 A.M. and 12:02 P.M. Additional and/or alternate time periods may be used within the scope of this disclosure.

In an embodiment, the management server device may change 410 a status of a client device in the client registry to non-compliant with the administrative policy if the management server device fails to receive one or more communications from the client device by a response time or within a time period after the response time. For example, the management server device may change 410 the status of a client device to non-compliant in the client registry if the management server device does not receive a communication from a client device by a response time or within a time period from the response time. In an embodiment, the management server device may change 410 the status of a client device to non-compliant in the client registry if a certain number of communications are not received from a client device during a time period. For example, the management server device may change 410 the status of a client device to non-compliant in the client registry if it does not receive three communications from a client device within a 24 hour time period. In an embodiment, the management server device may change 410 the status of a client device to non-compliant in the client registry if it does not receive a certain percentage of communications from a client device during a time period. For example, the management server device may change 410 the status of a client device to non-compliant in the client registry if it does not receive at least 90% of communications from the client device within a 24 hour time period. In an embodiment, the management server device may change 410 the status of a client device to non-compliant in the client registry if it does not receive a certain number of sequential communications from a client device. For example, the management server device may change 410 the status of a client device to non-compliant in the client registry if it does not receive two communications in a row from the client device.

In an embodiment, the management server device may change 410 the status of a client device to non-compliant with an administrative policy in response to the client device being reported lost or stolen, or in response to a user of the client device becoming unaffiliated with the administrator. For example, if an employee client device user is no longer employed by an employer administrator, the management server device may change the status of the client device to non-compliant in the client registry.

In an embodiment, after the client application is installed on the client device, the client device may transmit 202 an access request to an administered resource to the authentication server device. The authentication server device may verify 302 that the client device is in compliance with the administrative policy and, if so, may send 308 the client device a token that the client device may use to access the requested administered resources.

Figure 6:
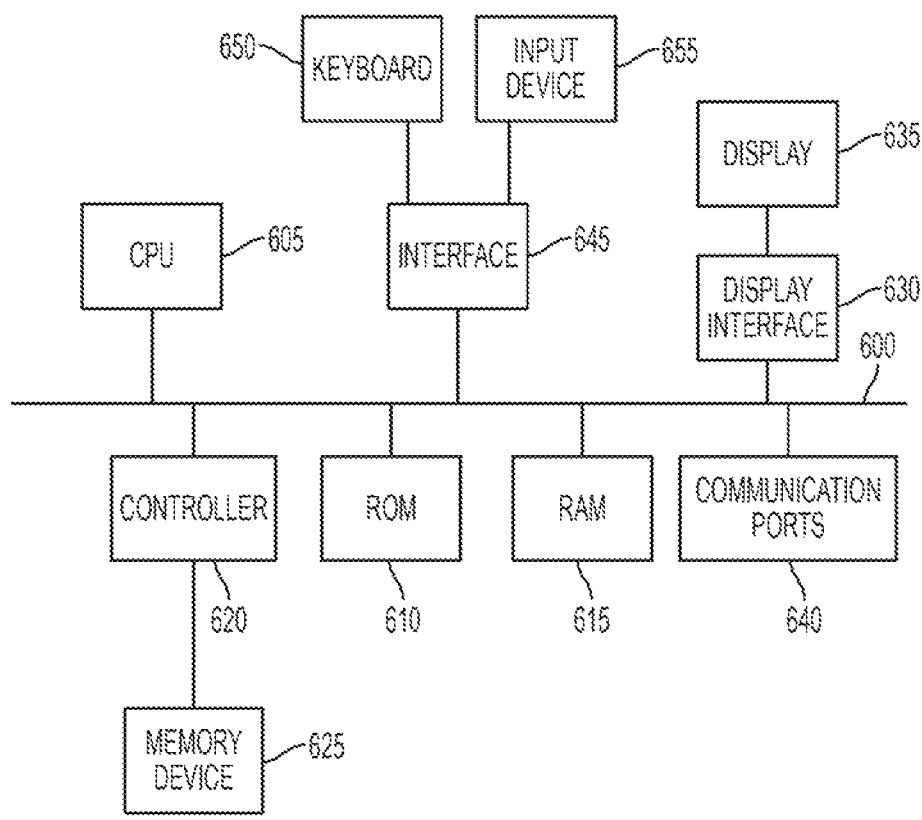
FIG. 6 illustrates a block diagram of internal hardware that may be used to contain or implement program instructions according to an embodiment.

FIG. 6 depicts a block diagram of exemplary hardware that may be used to contain or implement program instructions according to an embodiment. A bus 600 serves as the main information pathway interconnecting the other illustrated components of the hardware. CPU 605 is the central processing unit of the system, performing calculations and logic operations required to execute a program. Read only memory (ROM) 610 and random access memory (RAM) 615 constitute exemplary memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions may be stored in the ROM 610 and/or the RAM 615. Optionally, program instructions may be stored on a tangible computer readable storage medium such as a hard disk, compact disk, a digital disk, flash memory, a memory card, a USB drive, an optical disc storage medium, such as Blu-ray™ disc, and/or other recording medium.

An optional display interface 630 may permit information from the bus 600 to be displayed on the display 635 in audio, visual, graphic or alphanumeric format. Communication with external devices may occur using various communication ports 640. An exemplary communication port 640 may be attached to a communications network, such as the Internet or an intranet.

The hardware may also include an interface 645 which allows for receipt of data from input devices such as a keyboard 650 or other input device 655 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
   sending, by a client device, a first access request to an authentication server that maintains a client registry indicating a unique identifier of the client device and a status associated with the unique identifier indicating whether the client device is compliant with an administrative policy, wherein the first access request comprises a request to access an administered resource that is subject to the administrative policy which governs access to the administered resource;
   in response to the client device not complying with the administrative policy associated with the administered resource, based on the status of the client registry indicating that the client device is not compliant with the administrative policy:
      receiving, by the client device and from the authentication server, one or more instructions regarding installation of a client application that instruct, at least one of the client device or a user of the client device, how to conform the client device to the administrative policy,
      receiving, by the client device, the client application in accordance with the one or more instructions,
      installing the client application on the client device, such that the client device is compliant with the administrative policy,
      responsive to sending a second access request to the authentication server, receiving, based on the status associated with the unique identifier in the client registry that indicates the client device is compliant with the administrative policy, a token that provides access to the administered resource, and
      accessing, using the token, the administered resources;
   receiving, by the client device, at least one instruction to send a communication to a management server at least at a certain time or within a certain time period;
   sending, by the client device, the communication to the management server at least at the certain time or within the certain time period, such that the client device has access to the administered resource;
   after not sending a subsequent communication to the management server at least at the certain time or within the certain time period, sending a third access request to access the administered resource; and
   determining, by the client device, that access is denied to the administered resource.

2. The method of claim 1, further comprising:
   sending a request for the client application to the management server,
      wherein receiving the client application comprises receiving the client application from the management server.

3. The method of claim 1, wherein the client application is configured, based on the administrative policy, to perform one or more of the following:
   cause a password to be required to access the client device;
   cause the password to meet one or more format requirements;
   force a password reset for the client device;
   automatically lock the client device in response to the client device operating in idle mode for a period of time; and
   prevent the client device from operating in idle mode.

4. The method of claim 1, further comprising:
   receiving, by the client device, at least one instruction that causes the client device to remove data from the client device; and
   removing, by the client device and based on the at least one instruction, the data.

5. The method of claim 1, wherein the client application is configured to communicate one or more of the following client device features to the management server:
   a phone number associated with the client device;
   a serial number associated with the client device;
   an indication of whether a call to or from the client device is active; and
   a location associated with the client device.

6. The method of claim 1, further comprising, in response to the client device complying with the administrative policy associated with the administered resource, sending the client device the token to use to access the administered resource.

7. The method of claim 1, further comprising outputting for display, by the client device, the one or more instructions regarding installation of the client device.

8. The method of claim 1, wherein the one or more instructions, received from the authentication server, instruct the client device to download the client application from a certain location in order to apply the administrative policy to the client device, wherein the method of claim 1 further comprises:
   determining that the one or more instructions indicate that the certain location is the management server; and
   wherein receiving the client application in accordance with the instructions further comprises:
      sending, by the client device a request to the management server to obtain the client application; and
      receiving, based on the request, the client application from the manager server.

9. A method comprising:
   receiving, from a client device, a first access request for an administered resource that is subject to an administrative policy which governs access the administered resource, the first access request including a unique identifier of the client device;
   determining, based on a client registry that includes the unique identifier of the client device and a status associated with the unique identifier indicating whether the client device is compliant with the administrative policy, whether the client device is compliant with the administrative policy associated with the administered resource;
   in response to the status associated with the unique identifier in the client registry indicating that the client device is compliant with the administrative policy, sending a token to the client device that provides access to the administered resource;

in response to the status associated with the unique identifier in the client registry indicating that the client device is not compliant with the administrative policy, sending the client device one or more instructions instructing at least one of the client device or a user of the client device how to conform the client device to the administrative policy;

receiving, by the client device, at least one instruction to send a communication to a management server at least at a certain time or within a certain time period;

sending, by the client device, the communication to the management server at least at the certain time or within the certain time period, such that the client device has access to the administered resource;

after not sending a subsequent communication to the management server at least at the certain time or within the certain time period, sending a second access request to access the administered resource; and determining, by the client device, that access is denied to the administered resource.

10. The method of claim 9, further comprising:

comparing the unique identifier with information in the client registry;

in response to determining, based at least in part on the comparing, that the unique identifier matches information from the client registry and the status associated with the information indicates that the client device is compliant with the administrative policy, determining that the client device is compliant with the administrative policy, in response to determining, based at least in part on the comparing, that the unique identifier does not match information from the client registry, determining that the client device is not compliant with the administrative policy, and in response to determining, based at least in part on the comparing, that the unique identifier matches information from the client registry and the status associated with the information indicating that the client device is not compliant with the administrative policy, determining that the client device is not compliant with the administrative policy.

11. The method of claim 9, wherein sending the client device the one or more instructions comprises sending the client device one or more instructions instructing the client device to download a client application from a management server, wherein the client application is configured to apply one or more data security policies to the client device.

12. The method of claim 11, wherein the client application is configured, based on the administrative policy, to apply one or more of the following data security policies to the client device:
- causing a password to be required to access the client device;
- causing the password to meet one or more format requirements;
- forcing a password reset for the client device;
- automatically locking the client device in response to the client device operating in idle mode for a period of time; and
- preventing the client device from operating in idle mode.

13. The method of claim 11, further comprising:
sending at least one instruction that causes the client device to remove data at the client device.

14. The method of claim 9, further comprising, in response to receiving the first access request, notifying an administrator of the first access request.

15. A method comprising:

receiving, from a client device, a request to access a client application that indicates a unique identifier of the client device, wherein the client application is configured to apply an administrative policy to the client device, wherein the administrative policy governs access by the client device the administered resource;

responsive to determining, based on a client registry that includes the unique identifier of the client device and a status associated with the unique identifier indicating whether the client device is compliant with the administrative policy, that the client device is not compliant with the administrative policy associated with the administered resource, sending the client application to the client device;

updating the status associated with the unique identifier and included in the client registry with information that indicates the client device is compliant with the administrative policy;

sending at least one instruction to the client device that instructs the client device to send a communication to a management server at least at a certain time or within a certain time period;

receiving the communication at least at the certain time or within the certain time period, such that the client device has access to the administered resource;

after not receiving a subsequent communication from the client device at least at the certain time or within the certain time period, receiving from the client device an access request to access the administered resource; and updating the client registry to indicate that access is denied to the administered resource.

16. The method of claim 15, wherein:

updating the client registry comprises: responsive to determining that the client registry does not include the unique identifier, adding the unique identifier to the client registry with the associated status that indicates whether the client device is compliant with the administrative policy.

17. A system comprising:

one or more central processing units;

an authentication server operable by the one or more central processing units and in communication with a client device, wherein the authentication server determines whether the client device is permitted to access one or more administered resources, wherein the authentication server sends a token to the client device in response to determining that the client device is permitted to access the one or more administered resources; and a management server operable by the one or more central processing units and in communication with the client device and the authentication server, wherein the management server:

determines whether the client device is compliant with an administrative policy that governs an ability of the client device to access the one or more administered resources;

sends at least one instruction to the client device that instructs the client device to send a communication to the management server at least at a certain time or within a certain time period;

receives the communication at least at the certain time or within the certain time period, such that the client device has access to the administered resource;

after not receiving a subsequent communication from the client device at least at the certain time or within the certain time period, receives from the client device an access request to access the administered resource; and updates the client registry to indicate that access is denied to the administered resource.

18. The system of claim 17, further comprising a client registry in communication with the authentication server and the management server, wherein the client registry comprises information regarding compliance of one or more client devices with the administrative policy.

* * * * *